United States Patent
Wang et al.

(10) Patent No.: US 10,746,894 B2
(45) Date of Patent: Aug. 18, 2020

(54) MAGNETOTELLURIC MEASUREMENT SYSTEM

(71) Applicant: INSTITUTE OF GEOLOGY AND GEOPHYSICS CHINESE ACADEMY OF SCIENCES, Beijing (CN)

(72) Inventors: Zhongxing Wang, Beijing (CN); Qingyun Di, Beijing (CN); Tianxin Zhang, Beijing (CN); Fei Tian, Beijing (CN); Yongyou Yang, Beijing (CN); Wenxiu Zhang, Beijing (CN); Yujie Yang, Beijing (CN)

(73) Assignee: INSTITUTE OF GEOLOGY AND GEOPHYSICS CHINESE ACADEMY OF SCIENCES, Beijing (CN)

( * ) Notice: Subject to any disclaimer, the term of this patent is extended or adjusted under 35 U.S.C. 154(b) by 75 days.

(21) Appl. No.: 16/170,902

(22) Filed: Oct. 25, 2018

(65) Prior Publication Data

US 2019/0383960 A1 Dec. 19, 2019

(51) Int. Cl.
*G01V 3/165* (2006.01)
*G01V 3/40* (2006.01)

(52) U.S. Cl.
CPC .............. *G01V 3/165* (2013.01); *G01V 3/40* (2013.01)

(58) Field of Classification Search
CPC ........... G06K 7/10465; G06K 7/10356; G06K 7/10336; G06K 7/10346; G01N 27/72
USPC ...................... 324/200, 207.3, 244, 253, 254
See application file for complete search history.

(56) References Cited

U.S. PATENT DOCUMENTS

| | | | | |
|---|---|---|---|---|
| 6,617,972 B2 * | 9/2003 | Takarada | ........... | G08B 21/0484 340/635 |
| 8,779,729 B2 * | 7/2014 | Shiraishi | ............... | G06F 1/3212 320/155 |
| 2012/0098518 A1 * | 4/2012 | Unagami | ............. | G01R 22/066 324/74 |

* cited by examiner

*Primary Examiner* — Giovanni Astacio-Oquendo
(74) *Attorney, Agent, or Firm* — Platinum Intellectual Property LLP

(57) ABSTRACT

Disclosed is a magnetotelluric measurement system, comprising: a magnetic sensor probe for collecting an electromagnetic signal as an impulse response of an earth and transmitting the same to a signal readout circuit; the signal readout circuit configured for receiving and amplifying the electromagnetic signal collected by the magnetic sensor probe; a data acquisition and processing module configured for receiving and processing electromagnetic signal amplified by the signal readout circuit; a storage module configured for storing the electromagnetic signals amplified by the signal readout circuit and processed by the data acquisition and processing module; a first casing for enclosing the magnetic sensor probe and the signal readout circuit; and a second casing for enclosing the data acquisition and processing module and the storage module. The disclosure realizes the detection of low-noise wide-frequency band magnetic field signal, and solves problems involving deep detection of the mineral resources in complex areas.

9 Claims, 2 Drawing Sheets

MAGNETOTELLURIC MEASUREMENT SYSTEM

CROSS REFERENCE TO RELATED APPLICATIONS

This application claims a priority of Chinese Patent Application No. 201810623940.4, filed Jun. 15, 2018, the disclosure of which is hereby incorporated by reference in its entirety.

TECHNICAL FIELD

The disclosure relates to the field of geodetic technology, and in particular to a magnetotelluric measurement system.

BACKGROUND OF THE INVENTION

It is difficult to carry out deep ore prospecting on the ground because of harsh ground surface conditions and complex terrain in forests, marshes, deserts, wetlands and the like. There is an urgent need to develop aviation electromagnetic technology to solve a problem of deep exploration and build national resource security. The Aeronautical Electromagnetic Method (AEM) is a geophysical method in which an electromagnetic exploration device is carried on a flight platform for detection. The method is suitable for complex areas including mountain, desert, lake swamp, and forest areas. A helicopter podded aeronautical electromagnetic measurement system is based on a helicopter carrying platform, in which a multi-pulse primary-field electromagnetic signal is transmitted by a large magnetic moment transmitting coil in the air, and a secondary field is generated by an underground anomalous body and detected by a large dynamic range receiver at a pod, so that a distribution of underground electrical anomalous bodies may be detected.

An inductive transient electromagnetic sensor is developed based on the principle of Faraday's electromagnetic induction law, mainly for measuring an electromagnetic field strength varying with time and belonging to a sensor used in the application of geophysical exploration. About 40% of the aeronautical electromagnetic observation signals are noises and errors caused by various effects, and high-precision magnetic field sensors can improve the quality of original signals and greatly improve data of an aviation system. In the prior art, an aeronautical transient electromagnetic sensor system adopts a single coil design structure in each component direction, and is affected by noise severely during flight, is large and bulky, and has low near surface resolution and shallow depth of exploration.

SUMMARY OF THE INVENTION

In view of the above, embodiments of the disclosure provides a magnetotelluric measurement system, which may comprise: a magnetic sensor probe for collecting an electromagnetic signal an impulse response of an earth and transmitting the electromagnetic signal to a signal readout circuit, wherein the magnetic sensor probe may comprise three component directions, and wherein two coaxial coils of a same structure may be provided in each component direction, and a distance between the two coaxial coils in each component direction may be not less than a diameter of a single coil; the signal readout circuit configured for receiving the electromagnetic signal collected by the magnetic sensor probe, and amplifying the electromagnetic signal; a data acquisition and processing module configured for receiving and processing the electromagnetic signal amplified by the signal readout circuit; a storage module configured for storing the electromagnetic signal amplified by the signal readout circuit and the electromagnetic signal processed by the data acquisition and processing module; a first casing for enclosing the magnetic sensor probe and the signal readout circuit; and a second casing for enclosing the data acquisition and processing module and the storage module.

In some embodiments, the magnetic sensor probe may be of a three-axis Helmholtz coil structure.

In some embodiments, a distance between two coaxial coils in each component direction of the magnetic sensor probe may be not less than a diameter of a single coil.

In some embodiments, the signal readout circuit may employ a parallel transistor amplification technique.

In some embodiments, the data acquisition and processing module may employ a multiplex-gain parallel real-time acquisition technique.

In some embodiments, the first casing may be made of a non-magnetic, non-metallic material comprising fiber reinforced polymer, nylon, high strength PVC plastic, and polytetrafluoroethylene.

In some embodiments, the second casing may be made of a magnetic material.

In some embodiments, the system may further comprise an attitude recording device for recording a flight attitude in real time for later correction of data.

In some embodiments, the system may be a podded electromagnetic sensor.

In some embodiments, the system may further comprise a ground magnetic field signal sensor, and the ground magnetic field signal sensor and the podded electromagnetic sensor may constitute a magnetic field synchronous acquisition system.

In view of the current situation involving the difficulty in carrying out deep ore prospecting on the ground in areas of harsh surface conditions in China, an electromagnetic measurement system of the dual-coil structure according to the embodiments of the disclosure is provided which may achieve detection of low-noise wide-frequency band magnetic field signals by employing techniques including magnetic sensor coil impedance matching, parallel transistor low-noise detection, and high-frequency electromagnetic interference suppression and the like. The podded aviation electromagnetic measuring sensor carried on an airborne platform is completed, which may solve the problem of deep exploration of mineral resources in complex areas, can find more mineral resources, create more economic benefits, and guarantee security of national resources.

BRIEF DESCRIPTION OF THE DRAWINGS

In order to more clearly illustrate the technical solutions of the embodiments of the disclosure, the drawings used in the description of the embodiments will be briefly described below. It is obvious that the drawings in the following description involve some embodiments of the disclosure. Other drawings may also be obtained by those skilled in the art in view of the disclosed drawings without creative efforts.

DETAILED DESCRIPTION OF THE INVENTION

To make the objectives, the technical solutions and the advantages of the disclosure more clear, the technical solutions of the embodiments of the disclosure will be clearly and completely described in the following in conjunction with the accompanying drawings of the embodiments of the disclosure. Apparently, the disclosed embodiments are only parts of the embodiments of the invention, not all of the embodiments. All other embodiments obtained by those skilled in the art based on the embodiments of the disclosure without creative efforts are within the scope of the disclosure.

In the description of the disclosure, it should be further noted that the terms "dispose", "couple", and "connect" should be understood broadly, unless otherwise explicitly stated. For example, "connect" may be a direct connection, connected indirectly through an intermediate medium, or internal communication between two components. The specific meanings of the above terms in the present disclosure can be interpreted by those skilled in the art based on a concrete situation.

In this disclosure, relationship terms such as first and second are used merely to distinguish one entity or operation from another entity or operation, and do not necessarily require or imply any actual relationship or sequence between these entities and operations. Furthermore, the term "comprise" or "include" or any other variants thereof is intended to cover a non-exclusive inclusion, such that a process, method, article, or device that comprises a series of elements may comprise not only those elements but also other elements not specified explicitly, or elements that are inherent to such a process, method, article, or device. An element that is defined by the phrase "comprising a . . . " does not exclude the presence of extra same elements in the process, method, article, or device that comprises said element.

In the prior art, an airborne electromagnetic measurement system adopts a single coil structure in each component direction, in which bumps, turns and the like of a helicopter during flight may cause a sway of a plane of a receiving coil, thereby generating an additional induced voltage, i.e., a flight noise. A conventional solution is to install an attitude measuring device on a coil to correct a result, but experiments prove that an error after correction is still large.

Figure 1:
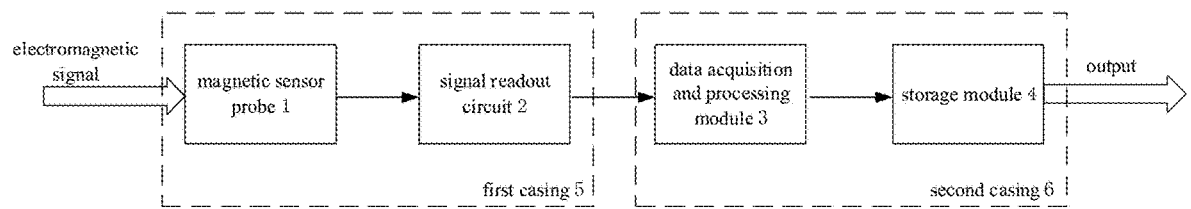
FIG. 1 is a schematic structural diagram of a magnetotelluric measurement system according to an embodiment of the disclosure.

In addition, with the prior art single-coil structure, in order to improve the accuracy and obtain a higher induced voltage signal, it is necessary to increase an area of the coil, which may increase the flight hazard of an aircraft. After analyzing the causes of the problems in the prior art, the inventors of the disclosure have proposed a magnetotelluric measurement system with a dual-coil structure. As shown in FIG. 1, the magnetotelluric measurement system may comprise a magnetic sensor probe 1 for collecting an electromagnetic signal as an impulse response of an earth and transmitting the electromagnetic signal to a signal readout circuit. The magnetic sensor probe may include three component directions, wherein two coaxial coils of a same structure may be provided in each component direction, and a distance between the two coaxial coils in each component direction may be not less than a diameter of a single coil.

Figure 2:
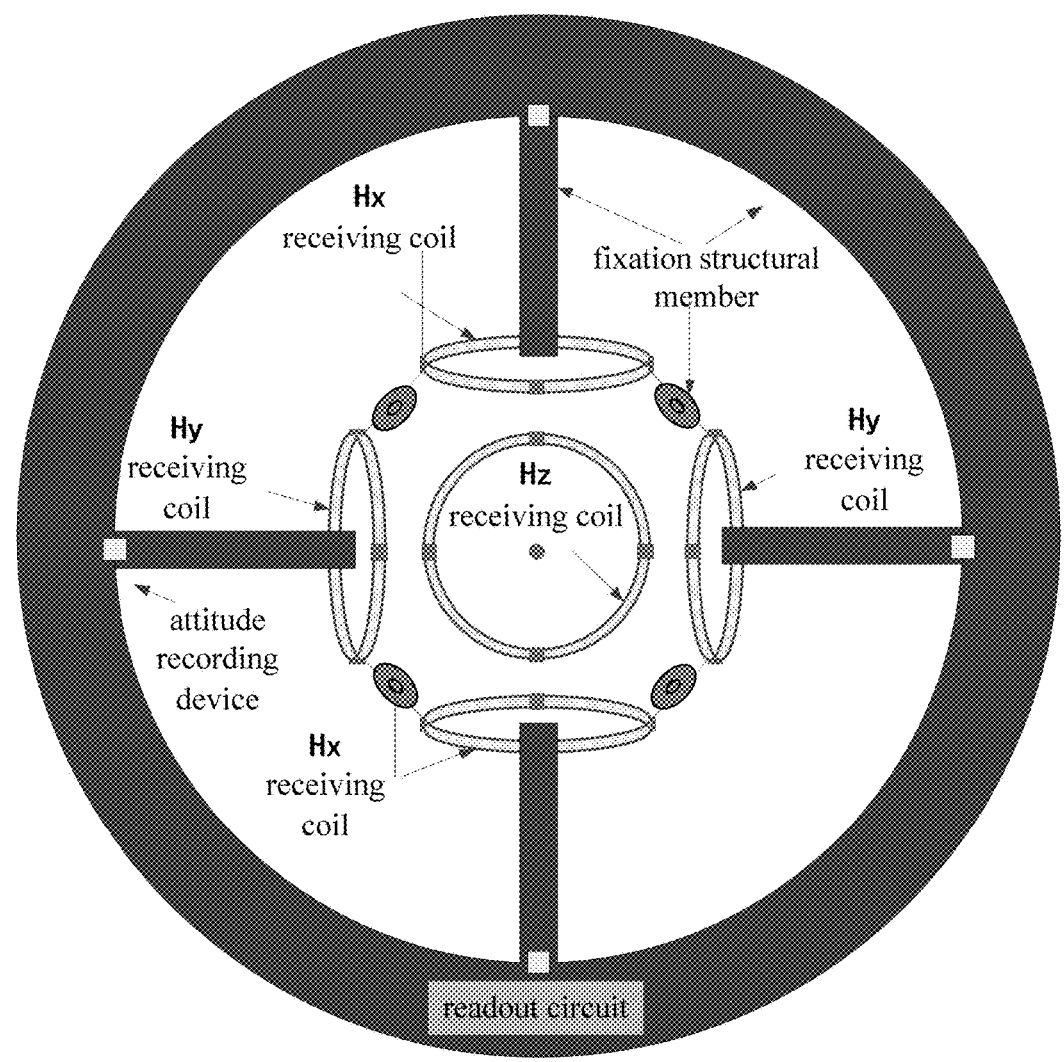
FIG. 2 is a schematic structural diagram of a three-component probe with a dual-coil structure according to an embodiment of the disclosure.

As shown in FIG. 2, the magnetic sensor probe of a three-component dual-coil structure may be realized by fixation structural members, and a three-axis Helmholtz coil structure may be constituted through a dual-coil design in every component direction. Such discrete design of the coils can reduce distributed capacitances and inductances between the coils, improve a resonant frequency of the sensor, and achieve a wider operating frequency band, in comparison with a single coil of same number of turns and same cross-sectional area. In some embodiments, in the three-component dual-coil structure, specifications of coils in X, Y, and Z directions for a same measuring point are unified, so that the three-axis sensor has a consistent performance. In contrast, a single-coil three-axis sensor has different sizes of coils in each direction, and coils are superposed in structure, so that there is interference. Further, the dual-coil design can also suppress the noise generated by the sensor during operation due to flight jitter, and be advantageous for axial (X, Y, Z direction) magnetic field correction.

Compared with the single-coil structure, in the dual-coil structure according to the embodiment of the disclosure, two identical coils may be installed coaxially in two parallel planes, and a difference correction may be performed on data measured by attitude measuring devices on the two coils to effectively filter out noise and improve accuracy. In some embodiments, in order to reduce mutual inductance, a distance between the two coils may be not less than a diameter of a single coil. In some embodiments, the distance between the two coils may be 30-70 mm. In this way, with the dual-coil structure, signals output may be equal to twice that of the single-coil structure, and the signal quality can be improved from the source. Further, considering that a depth of exploration is related to a frequency of a signal, a low-frequency signal has a strong penetrating ability, which is suitable for large-depth exploration, and a high-frequency signal is suitable for shallow surface exploration. Therefore, in order to increase the depth of exploration, it is necessary to increase the capability of detecting a low frequency signal. The dual-coil structure described in the embodiments of the disclosure can significantly improve the detection capability for low frequency signals.

In an embodiment of the disclosure, in order to further improve the detection accuracy, winding directions of two coils in the dual-coil structure may be adjustable. In some embodiments, when a sensor system is in a transmitting state, the winding directions of the two coils are opposite, thus flow directions of currents in the two coils are opposite, cancelling out an interference caused by a transmitting field. When the sensor system is in a receiving state, the winding directions of the two coils are the same, and at this point the flow directions of currents in the two coils are the same, being capable of reducing distributed capacitances and enhancing the sensitivity of the probe.

In some embodiments, in order to realize the adjustment of the winding directions of the two coils, a switch may be provided between joints of the two coils, and the switch can switch connection manners of the joints of the two coils. For example, when a connection is made in an alignment manner, the winding directions of the two coils may be the same, and when a connection is made in a crossed manner, the winding directions of the two coils may be opposite.

In an embodiment of the disclosure, fixation structural members of the magnetic sensor probe may be made of a non-magnetic material. In some embodiments, the non-magnetic material may be one or any combination of plastic PC, polypropylene, polytetrafluoroethylene, fiberglass, and wood and the like. In one embodiment of the disclosure, the coil may be wound with a precision enameled wire. To reduce the distributed capacitance, the magnetic sensor coil may be wound using a segmented winding method or a quasi-random winding method.

A key issue for an induction coil sensor is to develop a high-sensitivity, wide-band induction coil. However, in the prior art, it is generally believed that high sensitivity and wide frequency band are a pair of contradictions in the induction coil sensor.

A self-resonant frequency of a coil is determined by a formula, where L is an inductance of the coil and C is a distributed capacitance of the coil. It can be known from the formula that, in order to increase a bandwidth of the coil and increase a resonance point of the coil, it is necessary to reduce the distributed capacitance of the coil as far as possible. In the meanwhile, the reduction of the distributed capacitance of the coil can also improve temperature characteristics of the coil. On the other hand, high sensitivity requires a large receiving area of the coil and thus in a certain volume, a large number of turns of the coil is required, and in turn the inductance and distributed capacitance of the coil naturally increase, and a width of the frequency band of the coil is naturally reduced. In order to solve the problem of high sensitivity and wide frequency band, the present disclosure may produce coils suitable for a sensor with a high sensitivity and wide frequency band by adopting a coil-latticing winding method. In some embodiments, the resonance frequency of the coils can also be increased by controlling pitches of coils.

Research on receiving waveforms of a sensor under different damping coefficients based on a frequency response equation of sensor shows that the main differences lie in a response speed and presence or absence of oscillation. In an underdamping mode, a magnetic field sensor may respond quickly, but sometimes oscillations will be generated. In an overdamping mode, the magnetic field sensor may have no oscillations, but respond slowly. A wide bandwidth and good linearity are required to receive earth electromagnetic field signals, so it is necessary to add damping to make the frequency band wider and obtain better linearity. However, the overdamping will cause too large delay, affecting normal measurement, while the underdamping will cause oscillations. Studies show that there is no oscillation and has a faster response speed in a critical damping mode, so an embodiment of the disclosure makes a selection to set the magnetic field sensor in the critical damping mode.

Further, an operating bandwidth of the magnetic field sensor may be determined by the resonant frequency of the coils, which is related to the inductance and capacitance of the coils. Therefore, studies on the influences of parameters such as the number of turns, an effective area, a winding process and a wire diameter of the coils, on a width of a frequency band of a sensor, finds reasonably-designed matching parameters of the coils and a preamplifier circuit of the sensor, and an optimal damping mode. In an embodiment of the disclosure, the optimal damping mode may be a critical damping mode, in which a signal to noise ratio can be increased and the sensitivity can be increased with a certain effective area of the coils.

A signal readout circuit 2 may be configured to receive an electromagnetic signal collected by the magnetic sensor probe 1 and amplify the electromagnetic signal.

Figure 3:
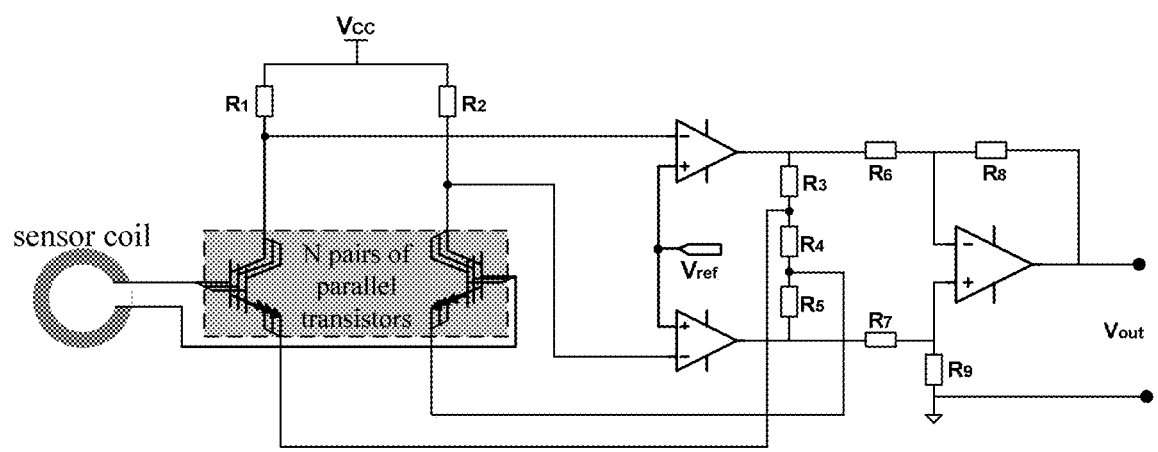
FIG. 3 is a schematic structural diagram of a signal readout circuit according to an embodiment of the disclosure.

In an embodiment of the disclosure, the signal readout circuit 2 may further include an amplifying circuit and an electronic low frequency signal switch circuit, as shown in FIG. 3. Considering that the noise of the amplifying circuit is one of the main sources of the noises of the sensor, the embodiment of the disclosure may adopt a parallel transistor amplification technology, and select a low noise analog circuit chip, to implement a low noise readout circuit. A preamplifier may be in a form of parallel transistor differential input to increase input impedances and suppress common mode noises. Since an effective receiving area of the sensor is a physical area of a receiving coil multiplied by a gain of the preamplifier, it is necessary to set a certain gain for the preamplifier in order to increase the effective receiving area.

In order to adjust a damping coefficient of a circuit according to a transfer function of sensor, it is necessary to precisely adjust resistance and capacitance values of the circuit. In an embodiment of the disclosure, the signal readout circuit may be made of an NPN transistor or a junction field effect transistor. In some embodiments, the signal readout circuit may have a high input impedance.

A data acquisition and processing module 3 may be configured for receiving and processing the electromagnetic signal amplified by the signal readout circuit 2.

In order to improve a detection precision, it is necessary to obtain a holographic signal at a time of power-on (primary field) and power-off (secondary field). An embodiment of the disclosure may adopt a multiplex-gain parallel real-time acquisition technology. In some embodiments, a signal may be acquired by a low gain channel during power-on, and the signal may be acquired by a high gain channel during power-off, and then the data may be combined in a time-division manner, so as to achieve large dynamic acquisition of full-time domain transmitting and receiving signals.

The data acquisition and processing module may preprocess the collected electromagnetic data, in order to be prepared for retrieving the real signal and accurately inverting underground medium information. The preprocessing method may include: background field noise removal, motion noise removal, attitude correction, data leveling, magnetic field three-component data fusion and fast time-frequency transform.

A storage module 4 may be configured for storing the electromagnetic signal amplified by the signal readout circuit 2 and the electromagnetic signal processed by the data acquisition and processing module 3.

A first casing 5 may be configured for enclosing the magnetic sensor probe 1 and the signal readout circuit 2 therein.

An electromagnetic noise generated by a flight platform and an electromagnetic noise generated by vibrations are main sources of dynamic noises of the three-component magnetic sensor, and intensities thereof are much larger than the natural electromagnetic field of the earth, and which are important factors affecting the signal quality obtained by the system. In one embodiment of the disclosure, to reduce electromagnetic noise, the casing may be made of non-magnetic non-metallic materials such as fiber reinforced polymer, nylon, high strength PVC plastic, and polytetrafluoroethylene.

In one embodiment of the disclosure, the casing may be designed aerodynamically, preferably shaped streamlined, in order to make the flight more stable and reduce flight noise.

In one embodiment of the disclosure, the magnetic sensor probe 1 and the signal readout circuit 2 may be fixed to the inside of the casing by welding so that the coil is less likely to sway and internal instruments are prevented from being damaged.

A second casing 6 may be configured for enclosing the data acquisition and processing module 3 and the storage module 4 therein.

In one embodiment of the disclosure, to reduce an impact of the data acquisition and processing module 3 and the storage module 4 on test results, the second casing may have magnetic shielding properties and be made of a magnetic material.

In one embodiment of the disclosure, an electromagnetic sensor system may further include an attitude recording device 7 that records flight attitude in real time for later correction of data.

In an embodiment of the disclosure, the attitude recording device may comprise an attitude sensing module, an acceleration sensor, an altimeter, a GPS or a Beidou navigation and an attitude data storage module. In some embodiments, in order to further reduce flight noise, an embodiment of the disclosure may adopt a multi-parameter correction scheme according to the above attitude data. In some embodiments, multiple parameters may be used to correct errors caused by motions such as tilting, vibration, altitude, etc., so as to restore data of measured true response components and achieve noise suppression of mobile platforms. In order to correctly reflect the attitude of the probe, the attitude recording device may be mounted inside the probe.

In one embodiment of the disclosure, to increase a signal to noise ratio of a signal, the electromagnetic sensor system may be a podded electromagnetic sensor. In some embodiments, in order to achieve high resolution and large depth detection at the same time, a ground magnetic field signal sensor may be provided on the ground, cooperating with the podded electromagnetic sensor to constitute a magnetic field synchronous acquisition system to realize synchronous acquisition of air and ground magnetic field signals. Compared with a single-type sensor acquisition, a systematic acquisition method according to the embodiment of the disclosure not only improves the test accuracy, but also achieves the high resolution and large depth detection simultaneously. Considering that signals in X and Y directions are more stable during ground exploration and have small variation, planar electromagnetic waves that are normally incident on the ground surface are mainly detected. In some embodiments, the ground magnetic field signal sensor may be also of a dual-coil structure, and the three-component dual-coil structure may be modified into a single component in a Z-axis direction, but the diameter of coils are larger, so four coils are subtracted from original number of coils, and in X and Y directions, signals are measured by square or circular coils perpendicular to each other in structure. In this way, the amount of data acquired by the acquisition system can be reduced. An electromagnetic excitation effect of the space environment on the underground medium can be utilized to detect low frequency signals, and a greater detection depth can be obtained.

In an embodiment, the ground magnetic field signal sensor may also adopt a coil-latticing winding method to wind a coil so as to reduce a capacitance and achieve a uniform distribution thereof, thereby increasing a bandwidth of the coil and improving a resonance point of the coil.

Since a ground magnetic field signal is weak and prone to be affected by external noise, a coil shielding technology may be employed in one embodiment of the disclosure to suppress interference and improve the stability of the coil. In some embodiments, a shielding material such as copper foil may be used for electric field shielding to reduce oscillation of the coil. Considering that when the coil responds to a square wave, the oscillation is easily generated at rise and fall edges of the square wave, an embodiment of the disclosure employs a comb-like shielding. Experiments show that with the above electric field shielding technology, the oscillation of the coil may be reduced and the stability in an operation of the sensor may be increased.

In view of the current situation involving the difficulty in carrying out deep ore prospecting on the ground in areas of harsh surface conditions in China, an electromagnetic measurement system of the dual-coil structure according to the embodiments of the disclosure is provided which may achieve detection of low-noise wide-frequency band magnetic field signals by employing techniques including magnetic sensor coil impedance matching, parallel transistor low-noise detection, and high-frequency electromagnetic interference suppression and the like. The podded aviation electromagnetic measuring sensor carried on an airborne platform is completed, which may solve the problem of deep exploration of mineral resources in complex areas, can find more mineral resources, create more economic benefits, and guarantee security of national resources.

While the preferred embodiments of the disclosure have been described, modifications and changes of these embodiments can be made by those skilled in the art once learned the inventive concept of the disclosure. Therefore, it is intended that the appended claims are interpreted as covering the preferred embodiments and all the modifications and changes falling in the scope of the disclosure.

It will be apparent that those skilled in the art can make various modifications and variations to the invention without departing from the spirit and scope of the invention. Thus, it is intended that the present invention covers all the modifications and variations provided that they belong to the scope of the claims of the invention and their equivalents.

The invention claimed is:

1. A magnetotelluric measurement system, comprising:
a magnetic sensor probe (1) for collecting an electromagnetic signal as an impulse response of an earth and transmitting the electromagnetic signal to a signal readout circuit (2), the magnetic sensor probe (2) comprising three component directions, wherein two coaxial coils of a same structure are provided in each component direction, and a distance between the two coaxial coils in each component direction is not less than a diameter of a single coil;
the signal readout circuit (2) configured for receiving the electromagnetic signal collected by the magnetic sensor probe (1), and amplifying the electromagnetic signal;
a data acquisition and processing module (3) configured for receiving and processing the electromagnetic signal amplified by the signal readout circuit (2);
a storage module (4) configured for storing the electromagnetic signal amplified by the signal readout circuit (2) and the electromagnetic signal processed by the data acquisition and processing module (3);
a first casing (5) for enclosing the magnetic sensor probe (1) and the signal readout circuit (2); and
a second casing (6) for enclosing the data acquisition and processing module (3) and the storage module (4).

2. The system of claim 1, wherein the magnetic sensor probe (1) is of a three-axis Helmholtz coil structure.

3. The system of claim 1, wherein the signal readout circuit (2) employs a parallel transistor amplification technique.

4. The system of claim 1, wherein the data acquisition and processing module (3) employs a multiplex-gain parallel real-time acquisition technique.

5. The system of claim 1, wherein the first casing (5) is made of a non-magnetic, non-metallic material comprising fiber reinforced polymer, nylon, high strength PVC plastic, and polytetrafluoroethylene.

6. The system of claim 1, wherein the second casing (6) is made of a magnetic material.

7. The system of claim 1, further comprising an attitude recording device for recording a flight attitude in real time for later correction of data.

8. The system of claim 1, wherein the system is a podded electromagnetic sensor.

9. The system of claim 8, further comprising a ground magnetic field signal sensor, the ground magnetic field signal sensor and the podded electromagnetic sensor constituting a magnetic field synchronous acquisition system.

* * * * *